US010678681B2

United States Patent
Markov et al.

(10) Patent No.: US 10,678,681 B2
(45) Date of Patent: Jun. 9, 2020

(54) METHOD AND DEVICE FOR AUTOMATIC TESTING

(71) Applicant: Siemens Aktiengesellschaft, München (DE)

(72) Inventors: Georgi Markov, Plainsboro, NJ (US); Ivan Tritchkov, Erlangen (DE)

(73) Assignee: Siemens Aktiengesellshaft (DE)

( * ) Notice: Subject to any disclaimer, the term of this patent is extended or adjusted under 35 U.S.C. 154(b) by 0 days.

(21) Appl. No.: 15/696,557

(22) PCT Filed: Mar. 10, 2015

(86) PCT No.: PCT/EP2015/054955
§ 371 (c)(1),
(2) Date: Sep. 6, 2017

(87) PCT Pub. No.: WO2016/141973
PCT Pub. Date: Sep. 15, 2016

(65) Prior Publication Data
US 2018/0011783 A1    Jan. 11, 2018

(51) Int. Cl.
*G06F 11/36*    (2006.01)

(52) U.S. Cl.
CPC ...... *G06F 11/3688* (2013.01); *G06F 11/3664* (2013.01); *G06F 11/3684* (2013.01)

(58) Field of Classification Search
CPC ............. G06F 11/3688; G06F 11/3664; G06F 11/3684
See application file for complete search history.

(56) References Cited

U.S. PATENT DOCUMENTS

| 8,903,691 | B2 * | 12/2014 | Bellamy | G06F 11/3684 345/650 |
| 9,734,044 | B2 * | 8/2017 | Harden | G06F 11/3684 |
| 2008/0127095 | A1 * | 5/2008 | Brennan | G06F 11/3664 717/124 |

(Continued)

OTHER PUBLICATIONS

PCT International Search Report and Written Opinion of International Searching Authority dated Oct. 19, 2015 corresponding to PCT International Application No. PCT/EP2015/054955 filed Mar. 10, 2015.

(Continued)

*Primary Examiner* — S. Sough
*Assistant Examiner* — Stephen D Berman
(74) *Attorney, Agent, or Firm* — Schmeiser, Olsen & Watts LLP

(57) ABSTRACT

A method for automatic testing of a piece of software for a mobile device including the following steps: deriving from a description a formalized description, the description includes possible sequences of events of the software and a range for at least one input parameter of the software, the description being used for an implementation of the software; generating from the formalized description a test description; adapting the test description for the mobile device for which the software is to be tested; translating the test specification in a language assigned to the mobile device such that a test described by the test specification can be performed on the mobile device. The method for automatic testing further relates to a corresponding device.

15 Claims, 1 Drawing Sheet

(56) References Cited

U.S. PATENT DOCUMENTS

| | | | |
|---|---|---|---|
| 2009/0197645 A1* | 8/2009 | Specchio | G06F 11/3684 |
| | | | 455/558 |
| 2010/0251209 A1 | 9/2010 | Murthy | |
| 2013/0024842 A1* | 1/2013 | Browne | G06F 11/3676 |
| | | | 717/125 |
| 2013/0326467 A1* | 12/2013 | Nair | G06F 11/3664 |
| | | | 717/101 |
| 2014/0025993 A1 | 1/2014 | Avadhanam et al. | |
| 2014/0047417 A1* | 2/2014 | Kaasila | G06F 11/3664 |
| | | | 717/135 |
| 2014/0122043 A1* | 5/2014 | Bellamy | G06F 11/3684 |
| | | | 703/6 |
| 2014/0229917 A1* | 8/2014 | Chiantera | G06F 11/3684 |
| | | | 717/124 |
| 2014/0325281 A1* | 10/2014 | Yazaki | G06F 11/3664 |
| | | | 714/38.1 |
| 2015/0254166 A1* | 9/2015 | Harden | G06F 11/3684 |
| | | | 717/124 |

OTHER PUBLICATIONS

European Examination Report for Application No. 15719738.4, dated Feb. 18, 2020.

\* cited by examiner

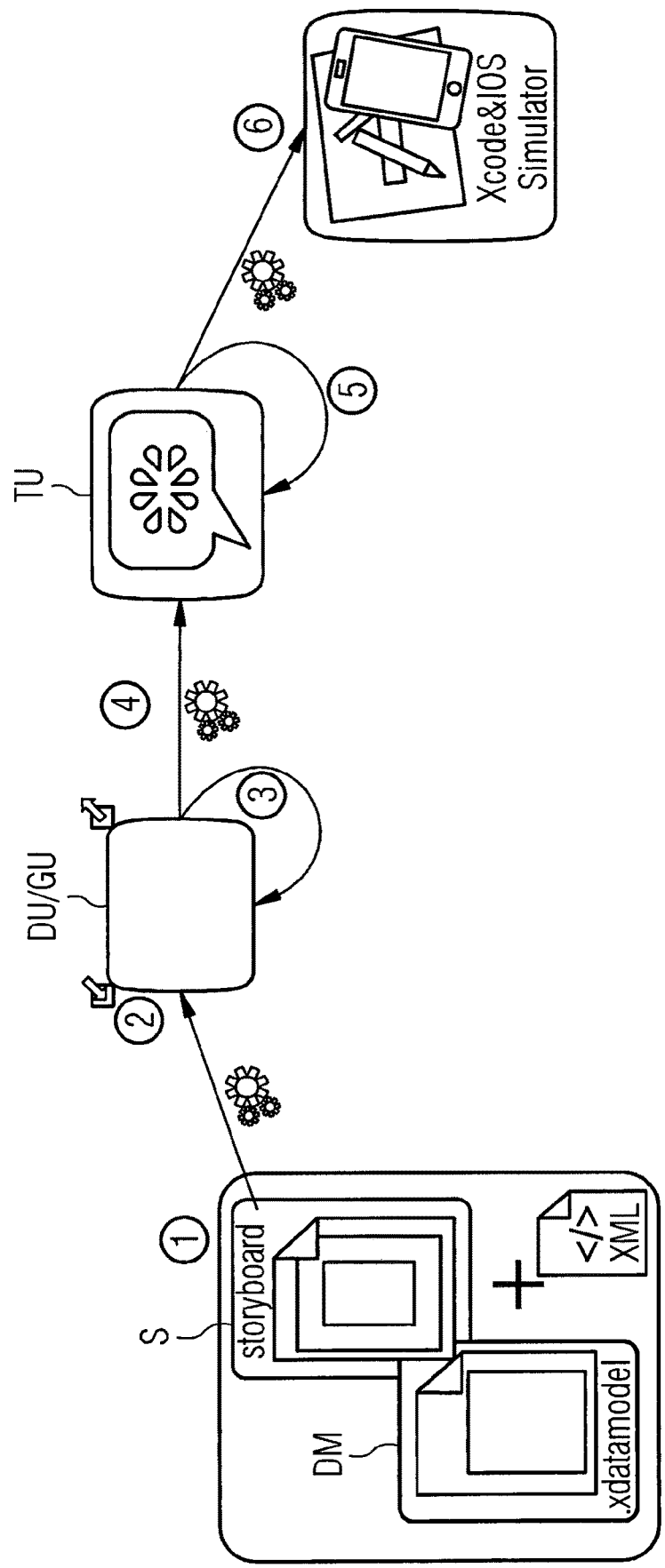

METHOD AND DEVICE FOR AUTOMATIC TESTING

CROSS-REFERENCE TO RELATED APPLICATIONS

This application claims priority to PCT Application No. PCT/EP2015/054955, having a filing date of Mar. 10, 2015, the entire contents of which are hereby incorporated by reference.

FIELD OF TECHNOLOGY

The following relates to a method and a device for automatic testing of a piece of software for a mobile device.

BACKGROUND

Testing of software is important to ensure that the software meets the requirements set and works correctly. However, a comprehensive testing is laborious and thus costly. Hence, the efforts in testing correlate also with the price for which the software can be sold.

Mobile applications are often offered at a very low price and consequently for mobile applications only basic testing is performed in-house. Then, for the majority of their testing needs, further testing is performed by the users of the application, which is referred to as "crowd testing", which is done only after distribution to some customers.

SUMMARY

An aspect relates to offering a possibility for comprehensive testing of mobile applications.

Embodiments of the invention relate to a method for automatic testing of an application or software on a mobile device. Thereby the following steps are performed:

From a description of the software a formalized description is derived which can then be used for generating from the formalized description a test description or test case.

The description has been used for an implementation of the application or software. This means in particular, that the set of sequences that has been designed in the software can be used also for the testing, i.e. the same description is used for implementation and testing. Further the description comprises a range for at least one input parameter of the application. Range can include only one possibility for the parameter or a variety of possibilities for the parameter.

The test case or test description constructed from the formalized description is translated in a language assigned to the mobile device such that the test case can be performed on the mobile device. Mobile device is understood in this context such, that the test case can be performed on a physical mobile device itself or in an environment simulating a mobile device.

Further, an adaptation of the test description in relation to the respective mobile devices, for which the software is intended and on which it should be tested takes place. This is particularly important as there is a much bigger variety in mobile devices than it is e.g. for fixed installed workstations. For example, size and shape of the display differ strongly as well as number, position, assignment and function of hard keys or buttons.

According to an advantageous embodiment the further step of importing, via an input interface, a description comprising the possible sequences or orders of events which can occur during execution of the application.

Preferably, according to various embodiments, the adaptation can take place after having derived the formalized description or/and generating the test description or/and translating the test specification or combined with any of these steps.

Embodiments of the invention further relate to a corresponding device for automatic testing and a software product.

One advantage is, that by using this approach the effort and costs for a comprehensive test design can be reduced. Further it can be ensured that all possible paths of a piece of software or an application have been tested, thus the test coverage and consequently the quality of an application is increased considerably in comparison to crowd testing or and "into the wild testing" methods, where no test concept is used.

BRIEF DESCRIPTION

Some of the embodiments will be described in detail, with reference to the following figures, wherein like designations denote like members, wherein:

FIG. 1 describes a schematic for producing automatically a test case for a mobile device.

DETAILED DESCRIPTION

In the following an example for iOS, the Apple operating system is described. Of course, embodiments of the invention can be applied to any operating system:

It is one aspect of embodiments of the invention that software descriptions or system models described e.g. for iOS by so called storyboards are used to automatically derive UML (unified modellings language) test models, which describe behavior, i.e. the possible sequences that can be pursued by a software program, and data, i.e. one or more input parameters with respective range at one or more positions of the sequences. The UML test models are then used to automatically generate test descriptions.

A storyboard is a visual representation of the user interface of an iOS application. It shows screens of content and the connections between those screens. Thus, a storyboard is composed of a sequence of scenes, i.e. a screen with content. The scenes are connected by segue objects. Further the interface may be specified by controls, which are used to trigger the segues or connection path between the screens.

Thus, a storyboard can contain all the possible screens of the respective application for a mobile device and therefore designates every sequence, which is designed or planned to occur in the mobile application. Thus the use of storyboards, which cover the whole software program, helps to increase the test coverage and consequently to improve the quality of the testing.

The test descriptions can be used to manually execute the tests on a variety of mobile devices or on a simulator, or to automatically derive executable test scripts such as cucumber recipes, which can be directly run on the devices or on the simulator.

FIG. 1 visualizes an embodiment where a test case for a device using iOS as operating system, is produced.

In a first step 1 a description of sequences of events that can be pursued within the application or software program are retrieved. As said above, in the framework of iOS the description can be realized by storyboards S and a data model. A storyboard may e.g. depict the content of a graphic display. Thus each storyboard S may describe an event and the data model DM corresponding to that storyboard S a set of parameters used in the context of the storyboard S and the range which each of the parameters can assume.

In a second step 2 this description is imported to a derivation unit DU, which derives from the informal description a formalized description or logical diagram. According to a preferred embodiment an UML (unified modeling language) diagram is produced. According to an advantageous embodiment there is an automatic import of workflow information and test data, i.e. categories. According to an embodiment the deriving unit DU is combined with a generating unit GU. According to another embodiment a tedeso tool is used for this combined unit.

In step 3 further refinement, e.g. adjustment of models, adding of data etc., takes place in the derivation unit DU. E.g. choices e.g. to partitions, pre- or post conditions can be added and further data are bound to the workflow, i.e. a definition takes place at which position of the workflow or event in the program certain parameter are required.

In addition, should the data imported in step 2 not be sufficient to run the tests on the physical devices, additional test data required for the test execution are introduced and thus the model or formalized description is extended. In particular, refinements are made to adapt the formalized description of the program for individual physical devices. E.g. the parameters describing the position of a touch on the touch display are adapted to the size and shape of the display of an individual mobile device to be tested. Another example is the consideration of keys or/and button of the mobile device to be tested.

In some embodiments no further refinement is needed or desired, thus step 3 is omitted.

In some other advantageous embodiments the adaptation takes place additionally or only later during or after generating a test description or translating.

In a fourth step 4 from the formalized description a test description is generated in a generating unit GU and transferred to a translating unit TU where the data are translated into a target language that can be run on the device to be tested. For an embodiment using an iOS operating system a "cucumber" tool may be used, which supports a variety of programming languages, such as Ruby, Java, C++. Thus a further adaptation to the device to be tested takes place, namely which language a device supports. According to advantageous embodiment an automatic export of cucumber scenarios is used.

In FIG. 1 the deriving unit DU and generating unit GU are depicted as one unit. According to other embodiments they are formed as separated units.

In a fifth step 5 a refinement of the translated formalized description or test description takes place. For some embodiments further refinement is not required or desired and therefore step 5 may be omitted. According to another embodiment cucumber receipts are created manually or automatically.

In a sixth step 6 testing based on the test description is performed, either on a physical device, e.g. an iOS smartphone, or on a simulator for the respective operating system, e.g. an iOS simulator.

One advantage of embodiments of the invention is the integration of several advanced test techniques, such as TDD or Test-driven Development, BDD or Behavior-driven Development, and MBT or Model-based Testing, and placing them in the context of mobile testing towards creating a new, systematic, automated, and tool-supported method for testing mobile applications, which heavily capitalizes on reusing existing artifacts from the development phase. The support by corresponding tools is important, as, for instance many organizations active in this field lack systematic methods and adequate tools for mobile testing. Thus, the existing tool support at each test level and the interface to other engineering disciplines such as development and requirements engineering is a further advantage.

Further, difficulties in reusing tests, which are among the top challenges in the area of mobile testing, can be overcome, as the test can be adapted for a variety of mobile devices. This is particularly important as for small applications or software programs for mobile devices, which are sold at a low prize, cost effectiveness is an issue. In addition, speeding up the test design allows selling earlier tested products which is very often the key success factor.

As mentioned above, the embodiments build upon the systematic reuse of system models created by default during the design phase, e.g. storyboards or/and data model. This system models might be used for various types of devices, because by concentrating on information from the design phase of the software to be tested, test cases can be produced without starting from the execution of the program on a specific device. This offers the above mentioned possibility of adaptation to various devices: For example if a test started from the GUI of an android device, e.g. a smartphone, for simulating a touch at a certain position with the coordinates (x,y), e.g. in order to select something, would require to generate or simulate an input at this position. This is often referred to as "capture and replay". However, if a different device with a smaller or bigger display was used, also the position of a touch would have to be created at a different position in order to perform the wanted selection.

Also, softkeys might be defined differently for different devices. In addition, also hardware and structural components can be affected, e.g. if a selection or change has to be made with a hardware key or button and different hardware keys are used with different devices.

In such a way, the method improves on the current state of the art by automating the test design phase, increasing the test coverage and in this way providing higher product quality.

According to the described embodiments the mobile devices, for which the software is intended, are such as smart phones tablet etc. The invention is not limited thereon but can be applied in the context of industry automatization with mobile production devices, such as robots. In this field a correct functioning of the individual components is very important. Reducing the costs for the necessary testing effort to ensure this correctness is therefore an important advantage.

Although embodiments of the present invention have been described in accordance with preferred embodiments and with iOS as an operating system, it is obvious for the person skilled in the art that modifications or combination between the embodiments, fully or in one or more aspects, are possible in all embodiments. Instead of storyboards, as used for iOS mobile applications, other descriptions of the application or piece of software to be tested may be used. Also advantageous embodiments start right from the UML (unified modeling language) descriptions which also cover the possible paths or sequences that can be taken by the software.

In particular it is also applicable for other operating systems, such as Android, Windows OS, Bada, PalmOS, webOS, or MeeGo.

In an embodiment, the method for automatic testing of a piece of software for a mobile device may be performed by a device. The device for automatic testing of the piece of software for the mobile device may comprise a first interface for communication with a derivation unit, which derives from the description a formalized description, the description comprising possible sequences of events of the software and a range for at least one input parameter of the application, the description being used for an implementation of the software; a second interface for communication with a generating unit, which generates from the formalized description a test description adaptable for a variety of mobile devices; a third interface for communication with a translating unit, which translates the test description in a language assigned to the mobile device, such that the test described by the test description can be performed on the mobile device; a fourth interface for communication with an adapting unit, which adapts the test description for the mobile device for which the software is to be tested; an output interface for transmitting the translated test description to a device to be tested or/and a simulator. In an embodiment, the device may further comprise an input interface for receiving a description comprising possible sequences of events of the software and a range for at least one input parameter of the application, the description being used for an implementation of the software. In an embodiment, at least one of derivation unit, generating unit, and the translating unit may be integrated therein or/and at least one of derivation unit, generating unit, and translating unit may be external in respect to the device. In an embodiment, the mobile device, for which the software is intended, may be a mobile communication device, and the mobile communication device may be a smartphone or portable computer. In an embodiment, the mobile device, for which the software is intended, may be a robot.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for automatic testing of a piece of software designed for a plurality of mobile devices comprising the following steps:
   a. deriving from a description a formalized description, wherein the formalized description comprises one or more storyboards or/and an assigned data model denoting at least one parameter and its range, the description comprising possible sequences of events of the software and a range for at least one input parameter of the software, the description being used for an implementation of the software;
   b. generating from the formalized description a test description adaptable for the plurality of mobile devices;
   c. adapting the generated test description for at least a first respective mobile device of the plurality of mobile devices for which the software is to be tested to generate a first adapted test description and adapting the generated test description for a second respective mobile device of the plurality of mobile devices for which the software is to be tested to generate a second adapted test description; and
   d. translating the first adapted test description in a first language assigned to the first respective mobile device such that a test described by the first translated test description can be performed on the first respective mobile device, and translating the second adapted test description in a second language assigned to the second respective mobile device such that a test described by the second translated test description can be performed on the second respective mobile device;
   e. wherein the first translated test description is provided to the first respective mobile device for performing the first translated test description on the first respective mobile device and the second translated test description is provided to the second respective mobile device for performing the second translated test description on the second respective mobile device.

2. The method according to claim 1 comprising a further step of receiving, via an input interface, the description.

3. The method according to claim 1 comprising the further step of transmitting, via an output interface, the first and second translated test descriptions.

4. The method according to claim 1, wherein the adapting depends on one or more of the following aspects:
   a. a type of the respective mobile device;
   b. an operating system of the respective mobile device;
   c. a user interface of the respective mobile device, is a type or size or/and shape of a display or/and a hardware key or/and button.

5. The method according to claim 1 wherein after the deriving of a formalized description further options within the sequences are introduced.

6. The method according to claim 1 wherein after the deriving of a formalized description data are assigned to a specified position within the possible sequences.

7. The method according to claim 1 wherein after the deriving of a formalized description additional test data used for execution of the automatic testing are introduced.

8. The method according to claim 1 wherein at least one of the steps a,b,c,d are combined and exchanged in order.

9. A computer program product, comprising a non-transitory computer readable hardware storage device having computer readable program code stored therein, said program code executable by a processor of a computer system to implement a method with program commands for executing the method according to claim 1.

10. A device for automatic testing of a piece of software for a variety of mobile devices comprising:
   a. a first interface for communication with a derivation unit, which derives from a description a formalized description, wherein the formalized description comprises one or more storyboards or/and an assigned data model denoting at least one parameter and its range, the description being used for an implementation of the software;
   b. a second interface for communication with a generating unit, which generates from the formalized description a test description adaptable for the variety of mobile devices, wherein the variety of mobile devices includes a first respective mobile device and a second respective mobile device;
   c. a third interface for communication with a translating unit, which translates the generated test description in a first language assigned to the first respective mobile device to generate a first translated test description, such that the test described by the first translated test description can be performed on the first respective mobile device, and which translates the generated test description in a second language assigned to the second respective mobile device to generate a second translated test description, such that the test described by the second translated test description can be performed on the second respective mobile device;

d. a fourth interface for communication with an adapting unit, which adapts the first translated test description for the first respective mobile device for which the software is to be tested to generate a first adapted test description and adapts the second translated test description for the second respective mobile device for which the software is to be tested to generate a second adapted test description;

e. an output interface for transmitting the first adapted test description to at least one of the first respective mobile device and a first simulator, and for transmitting the second adapted test description to at least one of the second respective mobile device and a second simulator.

11. The device according to claim 10 further comprising an input interface for receiving the description.

12. The device according to claim 10, wherein at least one of the derivation unit, generating unit, and translating unit is integrated therein and wherein at least one of the derivation unit, generating unit, and translating unit is external in respect to the mobile device.

13. The device according to claim 10, wherein the mobile device is a mobile communication device, wherein said mobile communication device is a smartphone or portable computer.

14. The device according to claim 10, wherein the mobile device is a robot.

15. A device for automatic testing of a piece of software for a plurality of mobile device types comprising:

a. a derivation unit, which derives from the description a formalized description, wherein the formalized description comprises one or more storyboards or/and an assigned data model denoting at least one parameter and its range the description being used for an implementation of the software;

b. a generating unit, which generates from the formalized description a test description adaptable for each mobile device type of the plurality of mobile device types;

c. a translating unit, which translates the generated test description in a first language assigned to a first respective mobile device type of the plurality of mobile device types to generate a first translated test description, such that the test described by the first translated test description can be performed on a mobile device of the first respective mobile device type, and which translates the generated test description in a second language assigned to a second respective mobile device type of the plurality of mobile device types to generate a second translated test description, such that the test described by the second translated test description can be performed on a mobile device of the second respective mobile device type;

d. an adapting unit, which adapts the first translated test description for the mobile device of the first respective mobile device type for which the software is to be tested to generate a first adapted test description and adapts the second translated test description for the mobile device of the second respective mobile device type for which the software is to be tested to generate a second adapted test description;

e. an output interface for transmitting the first adapted test description to at least one of the mobile device of the first respective mobile device type and a first simulator, and for transmitting the second adapted test description to at least one of the mobile device of the second respective mobile device type and a second simulator.

* * * * *